June 7, 1932.  A. WILHELMI  1,861,946
CARRIER FOR SLAG PANS AND THE LIKE
Filed June 25, 1931
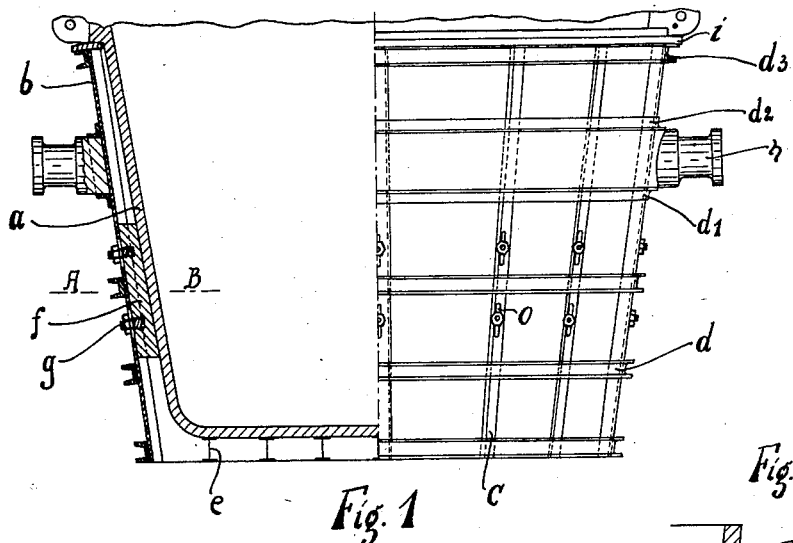
Fig. 1
Fig. 3
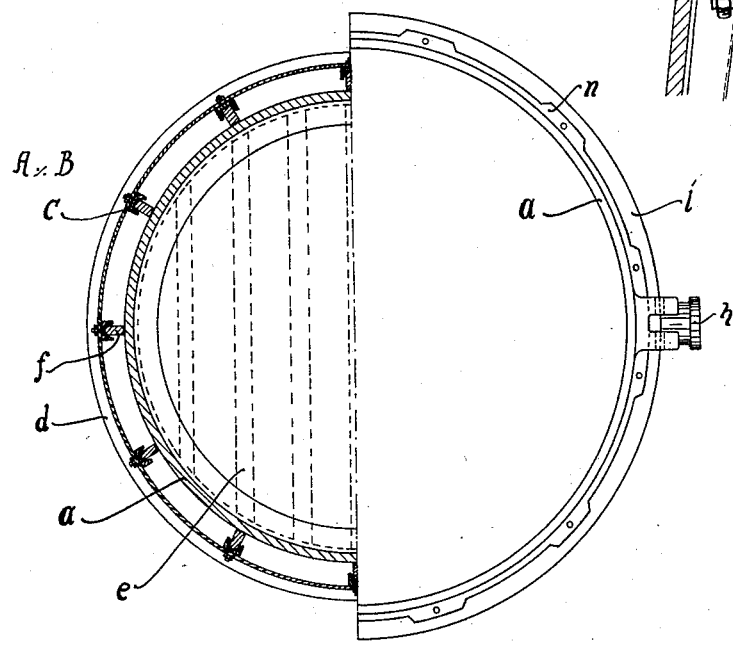
Fig. 2
Alfred Wilhelmi
by
C. P. Goepel Atty.

Patented June 7, 1932

1,861,946

UNITED STATES PATENT OFFICE

ALFRED WILHELMI, OF OBERHAUSEN, GERMANY

CARRIER FOR SLAG PANS AND THE LIKE

Application filed June 25, 1931, Serial No. 546,813, and in Germany July 11, 1929.

This invention relates to carriers for pans, and more particularly for slag-pans and has for its general object to provide a carrier of this kind as well as a pan permitting an increased lifetime of the latter.

It is known to mount the pans, especially slag-pans in suspended condition within a container or trough in a manner that said pan rests only with its upper projecting rim on the said container or trough. When using a construction of this kind, accordingly, the pan when in filled condition is bound to carry the load of the filling of the pan, thus causing tensional stresses to be imposed upon the pan at its lateral walls which are in a condition of free suspension. These tensional stresses, which are naturally greatest near the point of support of the pan on the carrier, will arise during tilting of the carrier with the pan therein at the lifted longitudinal half portion of the pan at only one side thereof. Carriers for pans which are of the known construction have the drawback that the pan will be prematurely subject to destruction owing to possible ruptures occurring at the lateral walls of the pan. The formation of ruptures at these places of the pan will further occur in case of insufficient cooling of the pan, especially during summer-time. These drawbacks which are inherent in pans and carriers now used furthermore cannot be avoided by vertical and horizontal re-inforcing ribs which are cast integral with the wall of the pan. Nor can such ruptures be avoided by means of protecting rings shrunk onto the bearing pivots, because said bearing pivots are likewise cast integral with the wall of the pan and consequently also subject to the aforementioned injurious stresses.

According to my invention, these disadvantages and drawbacks inherent to known types of pans and carriers are successfully avoided, by constructing the carrier for the pan in the form of a basket to secure proper support of the pan all around within said carrier and at the same time permit effective and evenly distributed cooling of the pan. Preferably, according to my invention the bottom of the carrier of basket-form is constructed as a grate which is able to support the bottom of the pan at a great number of points. In a construction of the kind already referred to, the longitudinal bars or rods of which the grate-like bottom of the carrier is constituted are preferably equipped with adjustable wedges to provide a more uniform support for the lateral walls of the pan after being inserted into the carrier with the bottom of the pan in firm contact with the grate-like bottom of the carrier. The advantages of this construction of the carrier in the form of a basket, accordingly, consist therein that the pan after being inserted into the carrier will no longer be subject to any further stresses. Also the pan by the use of such constructed carrier will more readily cool off. The pan is fastened within the basket-shaped carrier by means of screws surrounded by resilient springs.

In the accompanying drawing I have represented an example of my novel construction which is a preferred embodiment of my present invention, in which Fig. 1 is partly a half elevation and a half section of my new carrier for pans, Fig. 2 is a half plan-view and a half section along line A—B of Fig. 1; and Fig. 3 a detail view showing the novel mode of fastening the pan to the carrier.

Referring to the drawing, illustrating a preferred embodiment of my invention, a pan $a$ for slag and the like, preferably of the form and shape shown, is inserted into a basket-shaped carrier $b$. It is apparent, however, that the carrier may be made of any form or shape corresponding with that of the pan, without departing from the spirit and scope of the invention.

The carrier $b$, as shown in the drawing, is somewhat of a frusto-conical outline and has upwardly diverging channel bars or rods $c$ at spaced intervals along the periphery of the carrier. The bars have their channels facing the wall of the pan $a$. The intersecting bars $c$ are whooples or rings $d$, $d'$, $d^2$, $d^3$, etc., for connection with said bars to form a rigid basket-like container, as shown. The rings are generally channeled with their flanges projecting away from the vertically inclined rods $c$.

The floor or bottom of the carrier is provided with I-beams, angle or channeled iron bars $e$, I-beams being shown in Fig. 1 of the drawing. Said beams $e$ provide a floor rest for pan $a$ and furthermore tend to distribute the pressure and stresses exerted by the pan, particularly when full.

Intermediate the ends of the basket, wedges $f$ are disposed within the channels of the vertically inclined bars $c$ and the outer wall of the pan $a$. The wedges in the channels of bars $c$ are adjustable from the oblong holes $o$ in each bar $c$ by means of regulating screws $g$. Extending from the side of the carrier and oppositely disposed with respect to each other are trunnions $h$. A steel band between the rings $d'$ and $d^2$ is provided for reinforcing trunnions $h$ which serve as suspensions for the pan particularly during filling or emptying the same.

The top of the carrier is provided above the channel ring $d^3$ with a flange ring or washer $i$ for positioning the flanged portion of the pan $a$. The pan is retained in position within the carrier particularly during tilting, by means of bolts $m$ each carrying a spring $k$ between the nut and washer and the flange $i$. The spring provides sufficient tension to stabilize the pan and at the same time take up any stresses due to the movement of the pan within the carrier when emptying the slag from pan $a$.

While I have described one preferred embodiment of my invention, it is to be understood that various changes or modifications as to form, structure, arrangement of parts and use of materials may be made without departing from the spirit and scope of my invention, as defined in the herein appended claims.

I claim:

1. In combination, a pan, a carrier for said pan, said carrier having the form of a basket at the lateral walls as well as at its bottom, said pan being adapted, when inserted into said carrier, to rest on the bottom of the latter.

2. In combination, a pan, a carrier for said pan, said carrier being composed at its lateral walls as well as at its bottom of bars or rods in the manner of a basket, said pan being adapted, when inserted into said carrier, to be in supporting contact with the walls as well as with the bottom of said carrier.

3. In combination, a pan, a carrier for said pan, said carrier being composed at its lateral walls as well as at its bottom of bars or rods in the manner of a basket, and adjustable wedges intermediate the lateral walls and the walls of the pan for rendering lateral support thereto.

4. In combination, a pan, a carrier for said pan, said carrier being composed of bars or rods in the manner of a basket, and adjustable wedges for uniform support of said pan, when inserted into said carrier.

5. In combination, a pan, a carrier for said pan, said carrier being composed of bars or rods in the manner of a basket, said pan being adapted to rest on the bottom of said carrier, when inserted thereinto, and adjustable wedges for supporting contact between the lateral wall of said pan and the lateral wall of said basket.

6. A basket-like container for slag pans comprising inclined bars in spaced apart peripheral relation, horizontal annular bars intersecting and connecting said inclined bars and spaced means in connection with said inclined bars for supporting the slag pan, said carrier corresponding in general outline with the pan.

In testimony whereof I affix my signature.

ALFRED WILHELMI.